(12) United States Patent
Dyke

(10) Patent No.: US 8,864,408 B1
(45) Date of Patent: Oct. 21, 2014

(54) ROADWAY BARRIER TRANSFER APPARATUS

(71) Applicant: Lindsay Transportation Solutions, Inc., Omaha, NE (US)

(72) Inventor: Gerrit A. Dyke, Stockton, CA (US)

(73) Assignee: Lindsey Transportation Solutions, Inc., Omaha, NE (US)

( * ) Notice: Subject to any disclaimer, the term of this patent is extended or adjusted under 35 U.S.C. 154(b) by 0 days.

(21) Appl. No.: 14/021,172

(22) Filed: Sep. 9, 2013

(51) Int. Cl.
*E01C 5/00* (2006.01)
*B23Q 7/05* (2006.01)
*E01C 19/52* (2006.01)

(52) U.S. Cl.
CPC . *E01C 19/52* (2013.01); *B23Q 7/05* (2013.01); *G60P 3/40* (2013.01)
USPC .............. 404/73; 404/6; 404/84.05; 414/460; 414/754

(58) Field of Classification Search
CPC .............. B23Q 7/05; B60P 3/40; E01C 19/52
USPC .............. 404/6, 73, 83, 85, 86; 414/460, 461, 414/749.1, 749.6
See application file for complete search history.

(56) References Cited

U.S. PATENT DOCUMENTS

| | | |
|---|---|---|
| 4,017,200 A | 4/1977 | Woods, Jr. |
| 4,500,225 A | 2/1985 | Quittner |
| 4,624,601 A | 11/1986 | Quittner |
| 4,653,954 A | 3/1987 | Booth et al. |
| 4,666,332 A | 5/1987 | Burgett |
| 4,881,845 A | 11/1989 | McKay |
| 4,955,753 A | 9/1990 | McKay |
| 5,007,763 A | 4/1991 | Burgett |
| 5,246,305 A | 9/1993 | Peek |
| 5,253,951 A | 10/1993 | Peek |
| 5,688,071 A * | 11/1997 | Owen .............................. 404/6 |
| 5,720,572 A | 2/1998 | Richer |
| 5,885,046 A | 3/1999 | Peek et al. |
| 6,022,168 A | 2/2000 | Junker |
| 6,220,780 B1 | 4/2001 | Schindler et al. |
| 6,413,009 B1 | 7/2002 | Duckett |
| 7,168,881 B2 | 1/2007 | Hartlauer |
| 7,393,154 B1 | 7/2008 | Dyke et al. |
| 7,566,187 B2 | 7/2009 | Dyke et al. |
| 8,348,546 B2 | 1/2013 | Welch et al. |
| 2007/0160420 A1 | 7/2007 | Aoki |

FOREIGN PATENT DOCUMENTS

CA 2349359 11/2002

* cited by examiner

*Primary Examiner* — Raymond W Addie

(74) *Attorney, Agent, or Firm* — Thomas R. Lampe

(57) ABSTRACT

Compact, readily maneuverable apparatus for picking up and laterally transferring roadway barrier modules includes a vehicle for moving along a roadway barrier and elongated conveyors located at the sides of the vehicle, connected to the vehicle and pivotal between operative and inoperative positions.

18 Claims, 5 Drawing Sheets

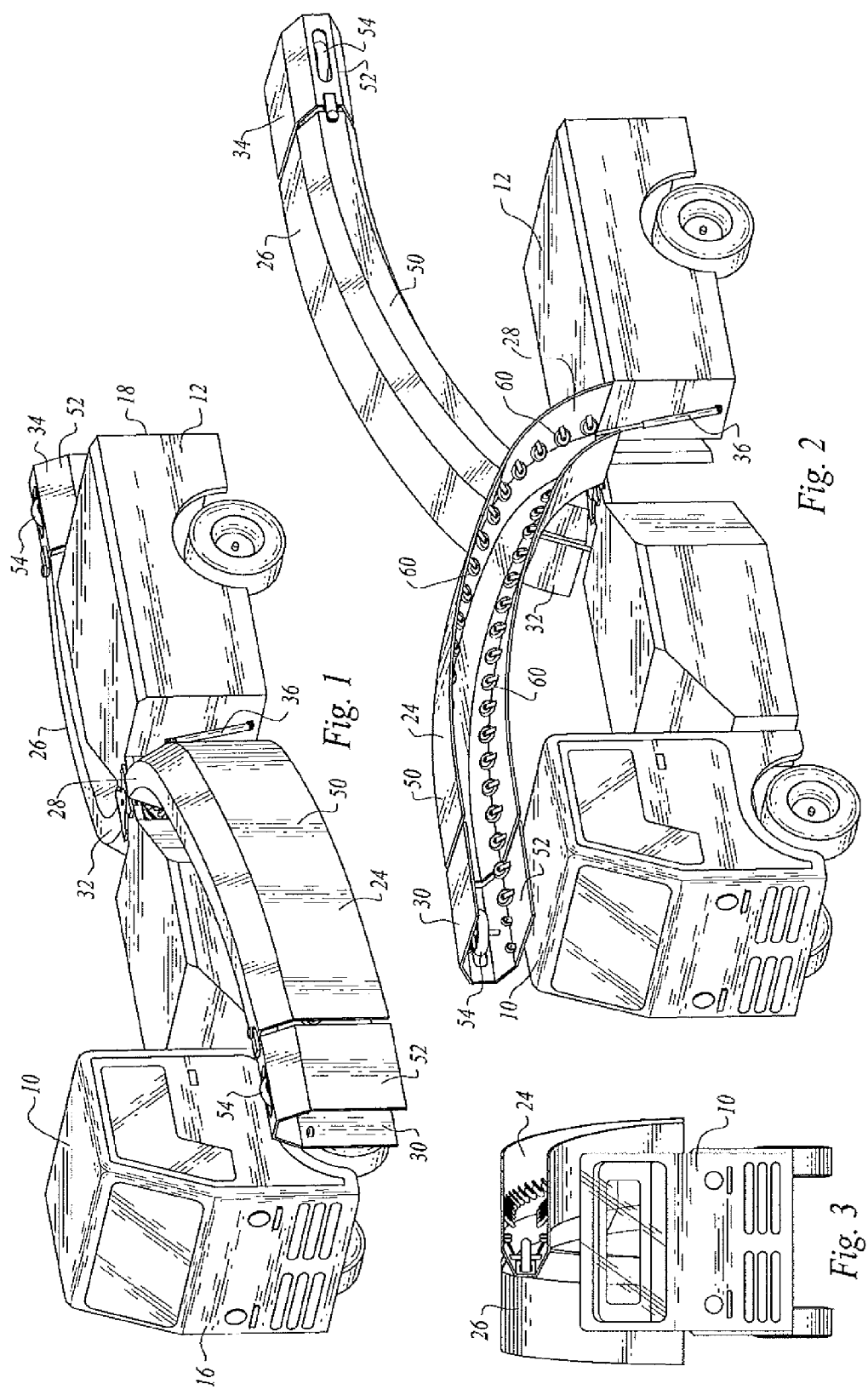

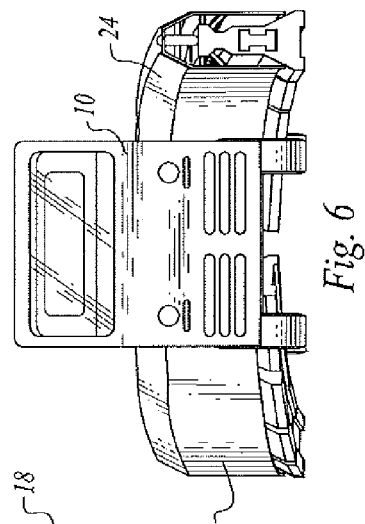
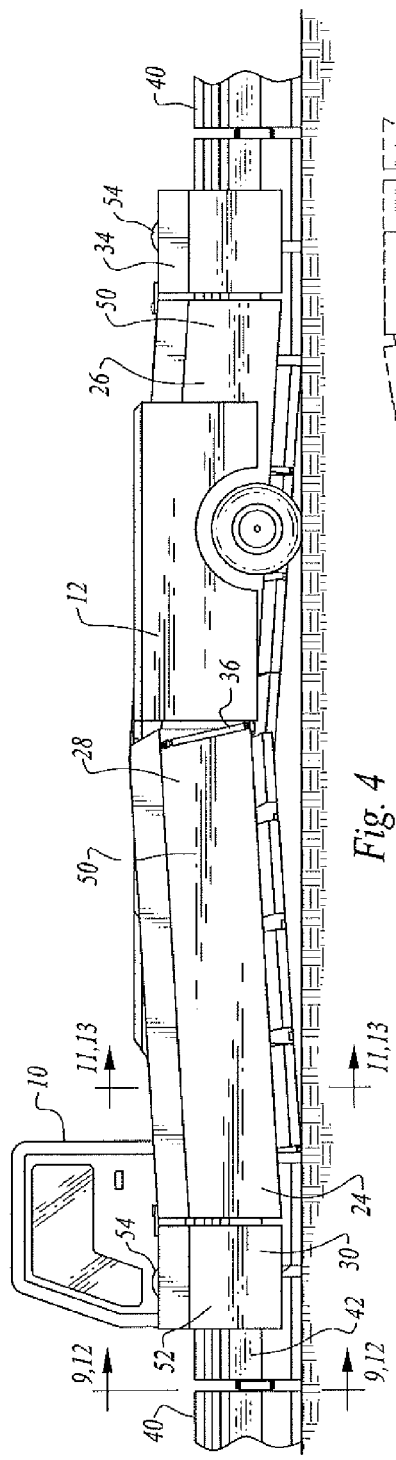
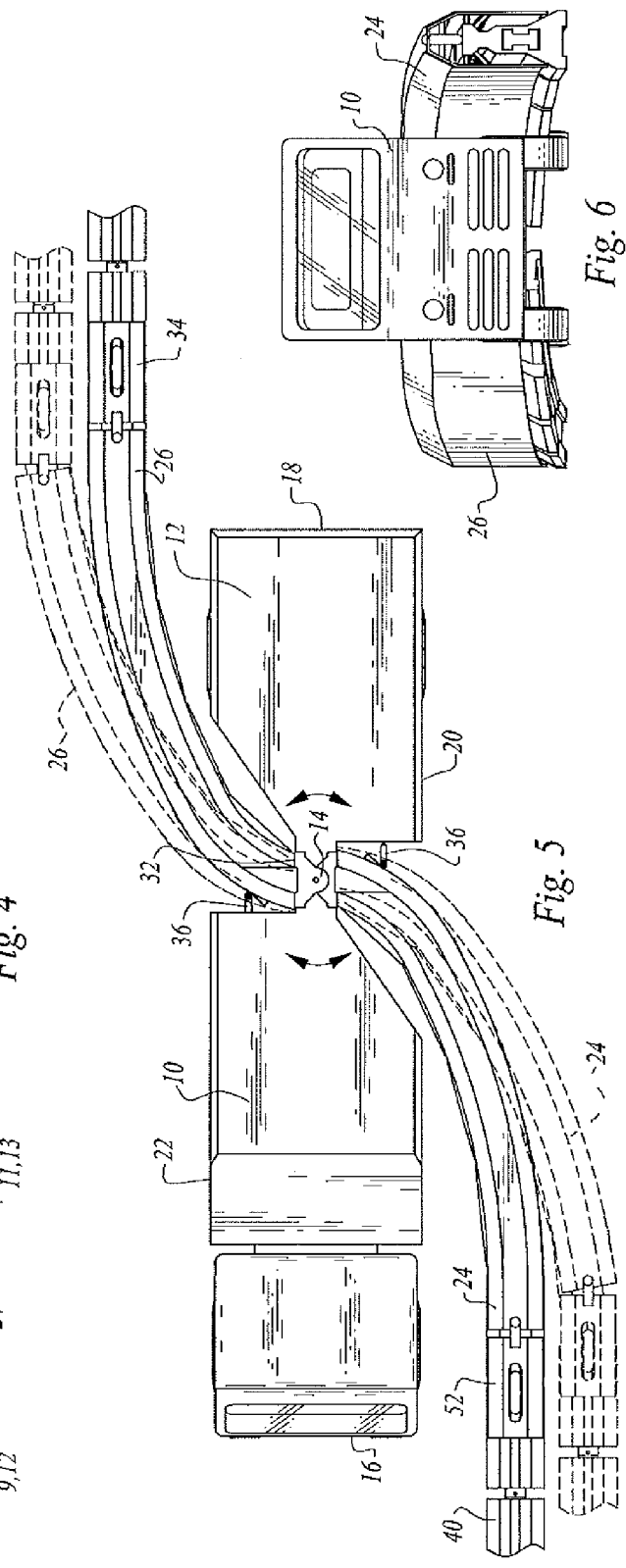

ROADWAY BARRIER TRANSFER APPARATUS

TECHNICAL FIELD

This invention relates to apparatus for picking up and laterally transferring a roadway barrier comprised of a plurality of interconnected barrier modules.

BACKGROUND OF THE INVENTION

It is well known to move roadway barrier segments or modules disposed end to end from one location to another. In some instances, the roadway barriers form an articulated barrier string, the barrier modules or segments being pivotally connected together. It is well known to incorporate wheels in the modules which allow the barrier to be towed from one location to another and also may be utilized to change the configuration of the barrier. Typically, the wheels are retracted after the barrier has been moved to ensure that it is not readily dislodged or moved by vehicle impact for example.

It is also well known to use self-powered wheeled machines to pick up and move roadway barrier modules or segments disposed end to end from one location to another. Some of these roadway barrier moving machines move along a string of roadway barrier modules, with a conveyor system of the machine engaging an outer surface or surfaces of the modules to lift the modules and transfer the string from one side of the machine to the other while the machine moves. One example of such a barrier transfer machine is manufactured by Lindsay Transportation Solutions, 180 River Road, Rio Vista, Calif. and made available under the Barrier Systems and Quick Change trademarks. Barrier transfer machines are typically quite massive, have a large footprint and limited maneuverability capability. Consequently, they are not suitable for use in urban or other crowded or congested environments.

The following patent documents are believed to be additionally representative of the prior art: U.S. Pat. No. 7,168,881, issued Jan. 30, 2007, U.S. Pat. No. 5,007,763, issued Apr. 16, 1991, U.S. Pat. No. 4,666,332, issued May 19, 1987, U.S. Pat. No. 7,566,187, issued Jul. 28, 2009, U.S. Pat. No. 5,720,572, issued Feb. 24, 1998, U.S. Pat. No. 6,413,009, issued Jul. 2, 2002, U.S. Pat. No. 4,881,845, issued Nov. 21, 1989, U.S. Pat. No. 4,624,601, issued Nov. 25, 1986, U.S. Patent App. Pub. No. US 2007/0160420, published Jul. 12, 2007, U.S. Pat. No. 5,246,305, U.S. Pat. No. 4,653,954, U.S. Pat. No. 5,253,951, U.S. Pat. No. 8,348,546, U.S. Pat. No. 4,017,200, U.S. Pat. No. 7,393,154, U.S. Pat. No. 6,220,780, U.S. Pat. No. 6,022,168, U.S. Pat. No. 5,885,046, U.S. Pat. No. 4,500,225, issued Feb. 19, 1985, U.S. Pat. No. 4,955,753, issued Sep. 11, 1990 and Canadian Patent No. 2 349 359, issued Aug. 5, 2008.

DISCLOSURE OF INVENTION

This invention relates to apparatus for picking up and laterally transferring a roadway barrier including a plurality of pivotally interconnected roadway barrier modules. The apparatus is compact and highly maneuverable during operation. It converts to an even more compact configuration when not being utilized to pick up and transfer barrier modules.

The apparatus includes a vehicle having a front vehicle end, a rear vehicle end and opposed vehicle sides between the front vehicle end and the rear vehicle end.

The apparatus further includes first and second elongated conveyors, each elongated conveyor having a proximal conveyor end pivotally connected to the vehicle and a distal conveyor end.

Conveyor mover structure on the vehicle is connected to at least the first elongated conveyor to pivot the first elongated conveyor relative to the vehicle between an inoperative position and an operative position. The first elongated conveyor when in the operative position extends forwardly in the direction of travel of the vehicle and is operative to serially pick up roadway barrier modules of a roadway barrier at the distal end of the first elongated conveyor as the vehicle moves along the roadway barrier.

The first elongated conveyor conveys the picked up roadway barrier modules toward the proximal end of the second elongated conveyor. The second elongated conveyor is operable to convey barrier modules received from the first elongated conveyor and discharge the received roadway barrier modules from the distal end of the second elongated conveyor and position the received roadway barrier modules on the roadway.

Other features, advantages and objects of the present invention will become apparent with reference to the following description and accompanying drawings.

BRIEF DESCRIPTION OF DRAWINGS

FIG. 1 is a perspective view of the apparatus of the invention with first and second elongated conveyors thereof in operative position;

FIG. 2 is a view similar to FIG. 1, but illustrating the first and second elongated conveyors in inoperative position;

FIG. 3 is a front elevational view of the apparatus with the first and second elongated conveyors in the inoperative position illustrated in FIG. 2;

FIG. 4 is a side, elevational view of the apparatus illustrating the vehicle moving along a roadway barrier and the apparatus being employed to pick up and laterally transfer pivotally interconnected roadway barrier modules of a roadway barrier, the apparatus moving toward the left as viewed in FIG. 4;

FIG. 5 is a top, plan view of the roadway barrier and the apparatus during operation thereof, the first and second elongated conveyors being shown in two different operative positions by solid and dash lines to effect transfer of barrier modules of roadway barriers spaced different distances from the sides of the vehicle, the barriers also illustrated in solid and dash lines;

FIG. 6 is a front, elevational view of the apparatus with the first and second elongated conveyors in operative position and laterally transferring the roadway barrier modules of a roadway barrier;

MODES FOR CARRYING OUT THE INVENTION

Figure 7:
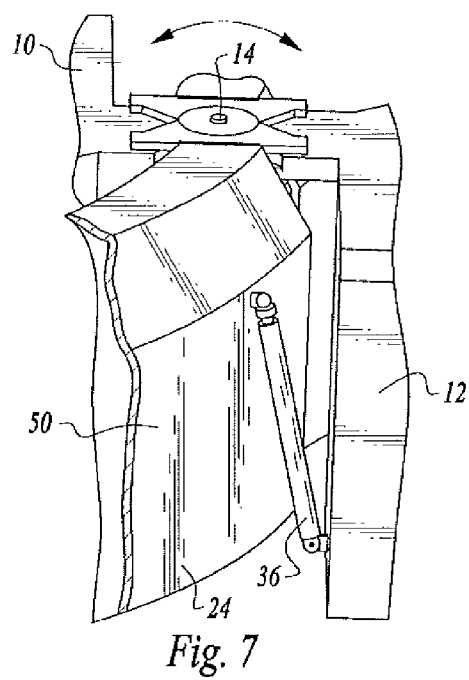
FIG. 7 is an enlarged, perspective view illustrating a portion of the apparatus including the proximal ends of the first and second elongated conveyors and segments of the vehicle tractor and trailer, the first and second elongated conveyors in operative position.

Referring now to the drawings, in particular FIGS. 1-11, apparatus constructed in accordance with the teachings of the present invention is illustrated. The apparatus is for picking up and laterally transferring a roadway barrier including a plurality of pivotally interconnected roadway barrier modules.

The apparatus includes a vehicle including a tractor 10 and a trailer 12 pivotally connected to the tractor at a pivot 14 and towed by the tractor. The vehicle has a front vehicle end 16, a rear vehicle end 18 and opposed vehicle sides 20, 22 between the front vehicle end and the rear vehicle end.

The apparatus additionally includes barrier transport structure in the form of an elongated conveyor 24 and an elongated conveyor 26. Elongated conveyor 24 has a proximal end 28 and a distal end 30. Elongated conveyor 26 has a proximal end 32 and a distal end 34. The proximal ends of the elongated conveyor are pivotally connected to the vehicle. More particularly, the proximal end 28 of elongated conveyor 24 is pivotally connected to trailer 12. The proximal end of elongated conveyor 26 is pivotally connected to tractor 10.

Figure 8:
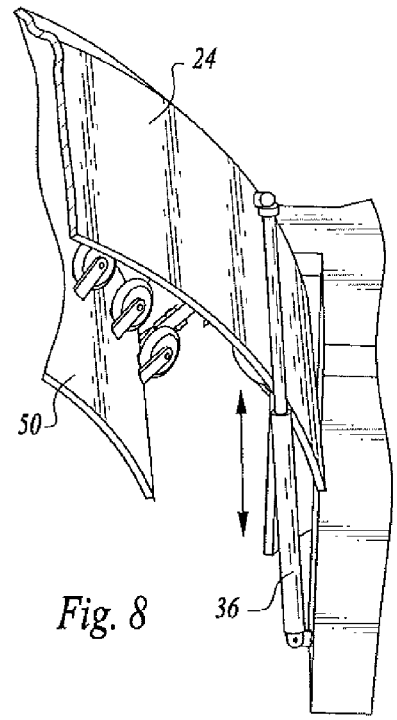
FIG. 8 is a view similar to FIG. 7, but illustrating the first elongated conveyor being elevated to inoperative position by conveyor mover structure.
Figure 9:
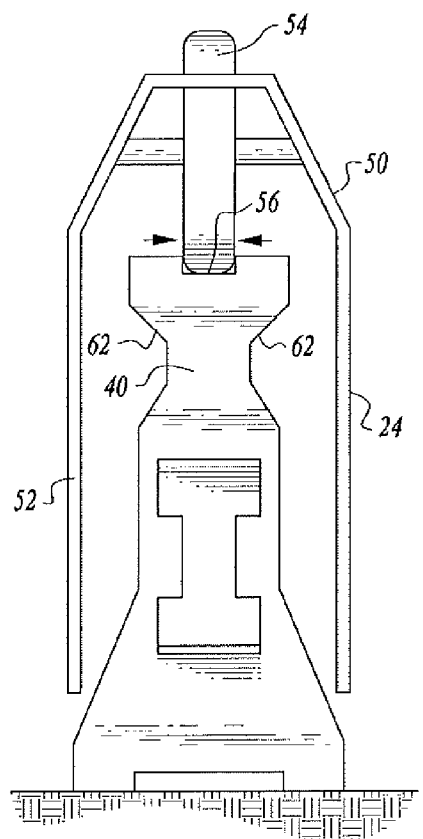
FIG. 9 is a greatly enlarged view taken along line 9-9 of FIG. 4 illustrating a first type of barrier module positioned on a roadway and supporting a wheel rotatably connected to an articulated housing portion of the first elongated conveyor.
Figure 10:
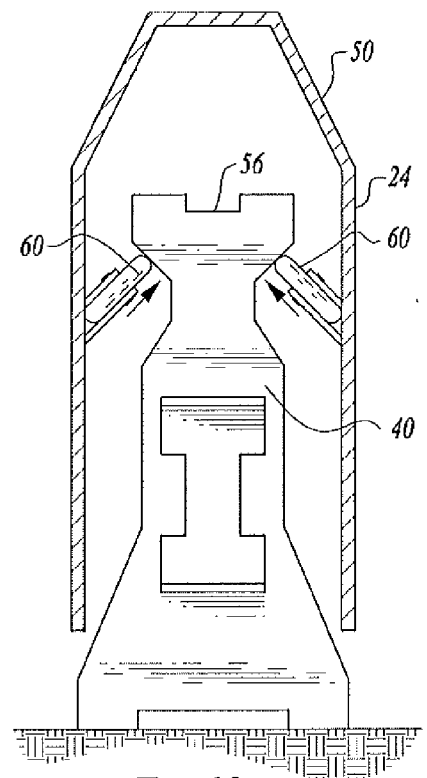
FIG. 10 is a partial, cross-sectional view illustrating the interior of the first elongated conveyor and illustrating rotatable conveyor transport elements projecting into the housing interior in engagement with a barrier module prior to lifting of the barrier module off the roadway.

The elongated conveyors 24, 26 are movable between an inoperative (raised) position shown in FIGS. 2, 3 and 8 and an operative (lowered) position shown in FIGS. 1, 3-7 and 9-11.

The elongated conveyors are separately and independently movable by conveyor mover structure between the operative and inoperative positions. In the arrangement illustrated, such movement is effected by hydraulic cylinders 36 independently operatively associated with each of the elongated conveyors. One hydraulic cylinder is attached to the trailer and the other to the tractor.

The elongated conveyor 24 when in operative position extends forwardly in the direction of travel of the vehicle and is operative to serially pick up roadway barrier modules 40 of roadway barrier 42 at the distal end of elongated conveyor 24 as the vehicle moves along the roadway barrier. The elongated conveyor 24 will convey the roadway barrier modules picked up at the distal end of the elongated conveyor 24 and convey the picked up roadway barrier modules to the proximal end of elongated conveyor 26.

Elongated conveyor 26 is operable to convey the roadway barriers modules received from the elongated conveyor 24 and discharge the received roadway barrier modules from the distal end of the elongated conveyor 26 and position the received roadway barrier modules on the roadway.

In the arrangement illustrated, the proximal ends of the elongated conveyors are pivotally mounted about pivot 14 interconnecting the tractor and trailer, the elongated conveyors being mounted to move horizontally about the pivot as shown in the dash and dotted line presentations of FIG. 5. Suitable structure such as hydraulic cylinders or manual actuator mechanism operatively associated with the elongated conveyors may be utilized to adjust the positions of the elongated conveyors relative to the sides of the vehicle to position the barriers at the desired roadway locations.

Each of the elongated conveyors includes a housing 50 which is pivotally connected to the vehicle as previously described and the elongated conveyors also include a plurality of conveyor transport elements within the housing for engaging, lifting and transporting the barrier modules during movement of the apparatus along the roadway barrier.

The housings 50 of the elongated conveyors are curved and the elongated conveyors when in operative position combine to form an S-shaped configuration, as shown in FIG. 5 for example. This results in portions of the elongated conveyors extending over the tractor and trailer when in inoperative position. Thus, the width of the apparatus is reduced when the elongated conveyors are in inoperative position and the height of the apparatus is not greatly increased when the elongated conveyors are in inoperative position. This results in a compact, easily maneuverable arrangement.

The housings 50 include open-ended housing portions 52 at the distal ends thereof, the open-ended housing portion 52 articulated relative to the rest of the elongated conveyors. This is readily accomplished by providing a hinge connection at the juncture of the housing portions 52 and the rest of the housing structure enabling the housing portions 52 to move within limits in both horizontal and vertical orientations. Supports are connected to the housing portions 52 for supporting the distal ends of the elongated conveyors when they are in operative position relative to roadway barrier string 42. In the embodiment under discussion the supports are in the form of support wheels 54 which engage and are supported by a support surface. More particularly, in the embodiment under discussion the support wheels 54 are rotatably mounted on the articulated housing portions 52 and extend into the interiors of the articulated housing portions 52 for engagement with the upper surfaces of the roadway barrier modules to support the elongated conveyors 24, 26. In the arrangement under discussion, and as shown for example in FIG. 9, the roadway barrier modules 40 include an elongated recess or channel 56 in which the support wheel 54 is positioned. The elongated recess has an elongated axis corresponding to that of the roadway barrier module and opposed lateral forces are applied to the support wheel by the module construction, as indicated by the arrows in FIG. 9, to maintain the roadway barrier module centered in the articulated housing portion 52 and thus in alignment with the main housing.

Figure 11:
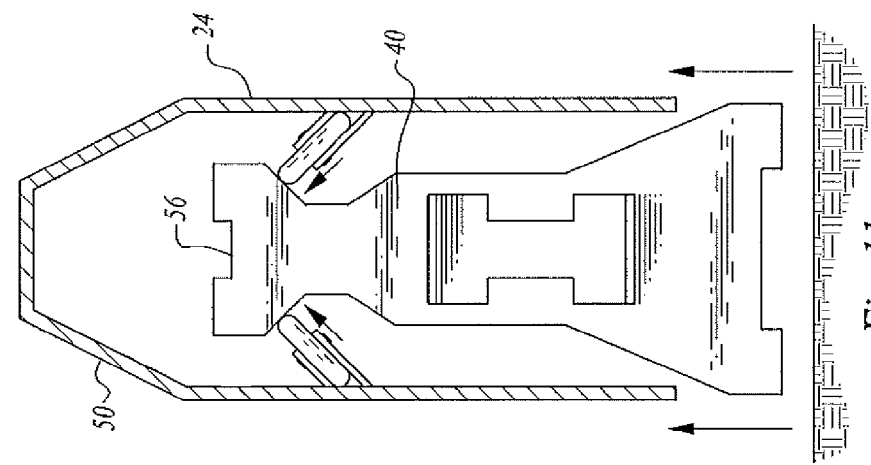
FIG. 11 is a view taken along line 11-11 of FIG. 4 showing rotatable conveyor transport elements lifting the barrier module off the roadway.

The conveyor transport elements of the elongated conveyors are in the form of disc-like rotatable conveyor transport elements 60 which extend along the lengths of the conveyors other than at the articulated housing portions 52. Modules 40 include opposed module surfaces 62 which are engaged by the rotatable conveyor transport elements 60. FIG. 11 shows the module 40 being lifted off the roadway by the elements 60, this being due to the upward slope of the elongated conveyor 24. Elongated conveyor 26 receives the interconnected modules 40 as they are discharged from the proximal end of conveyor 24. The elongated conveyor 26 will then convey the modules received from the elongated conveyor 24 and discharge them from the distal end thereof and deposit the connected modules on the roadway at the new location.

Figure 12:
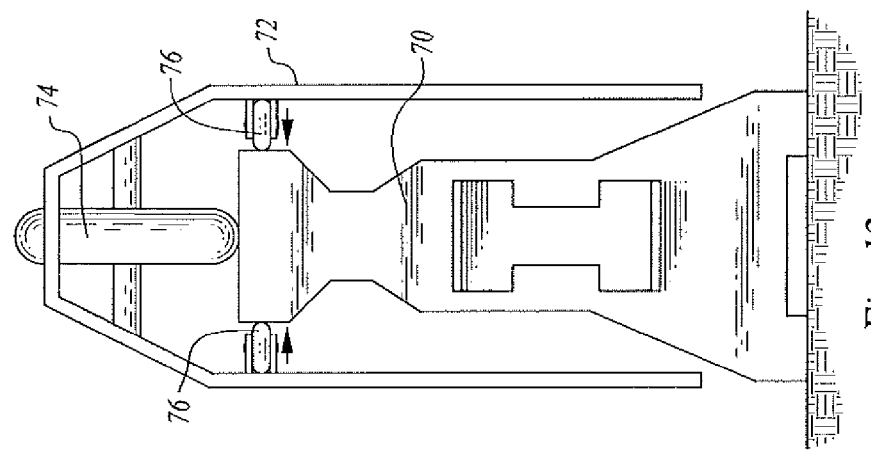
FIG. 12 is a view similar to FIG. 9, but illustrating an alternative embodiment of the invention employed with an alternative embodiment of barrier module.

FIG. 12 shows another module embodiment, module 70, entering into a alternative embodiment of articulated housing portion 72. In this arrangement, the upper surface of the module is flat, the support wheel 74 positioned on the top flat surface to support the elongated conveyor. In this arrangement, spacer wheels 76 are attached to the housing portion 72 and engage the sides of the module 70 within the interior to center the module and prevent direct engagement of the module with the outer walls of the articulated housing portion.

Figure 13:
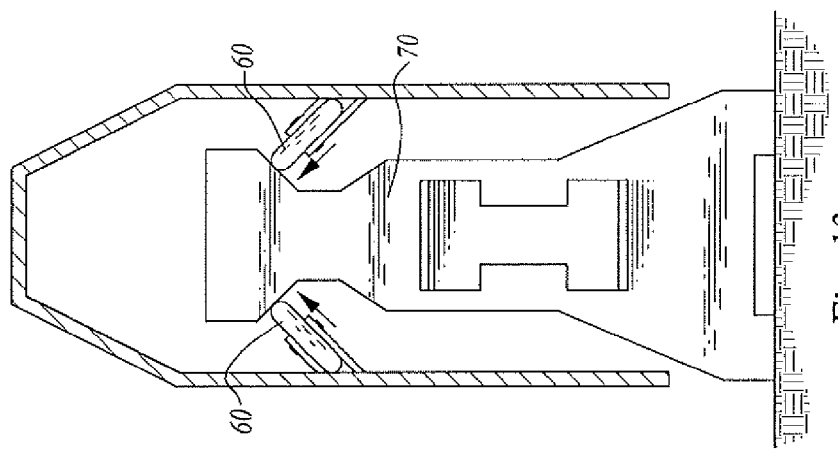
FIG. 13 is a view similar to FIG. 10 prior to lifting of the alternative form of barrier module of FIG. 12 by an alternative form of rotatable conveyor transport elements.

FIG. 13 illustrates that the rest of the elongated conveyor with which housing portion 72 is associated incorporates rotatable conveyor transport elements 60 such as those employed in the first module embodiment disclosed above.

Figure 14:
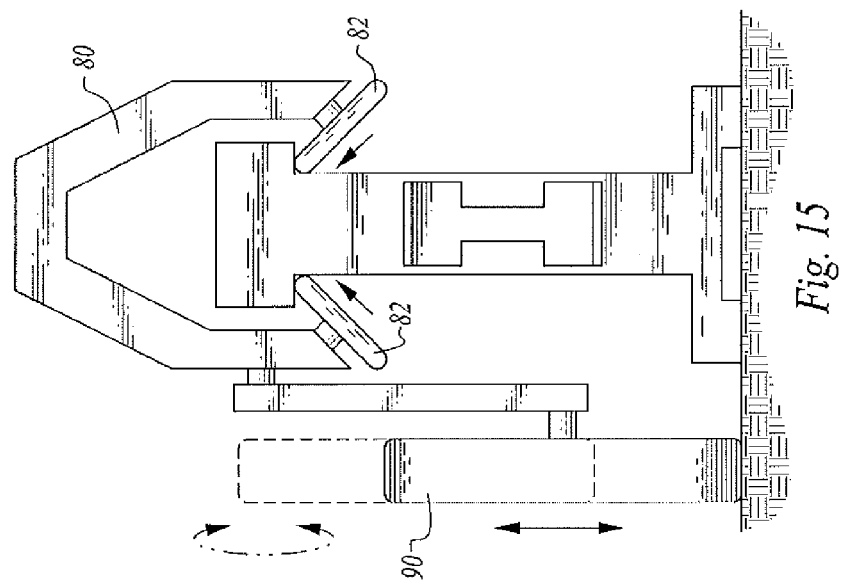
FIG. 14 shows yet another embodiment of barrier module being engaged by rotatable conveyor transport elements connected to the distal ends of the side walls of an elongated conveyor housing.

FIG. 14 shows an elongated conveyor embodiment 80 wherein rotatable conveyor transport elements 82 are rotatably attached at the lower ends of the side walls of the housing portion thereof.

Figure 15:
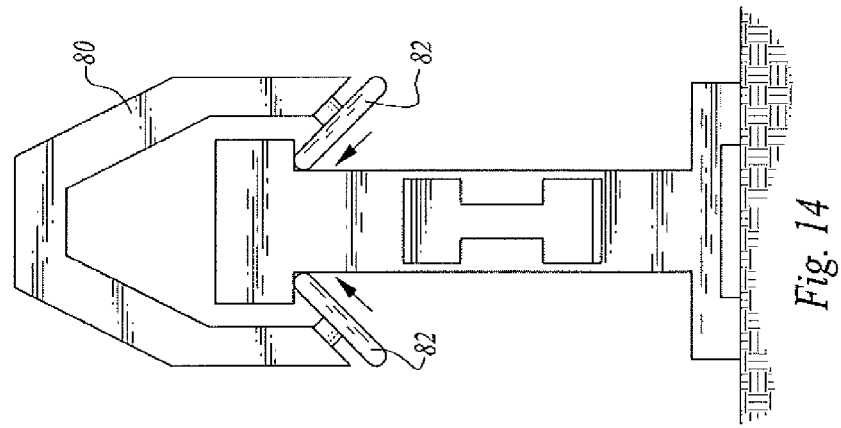
FIG. 15 is a view similar to FIG. 14, but illustrating an alternative arrangement wherein a roadway engagement wheel disposed externally of the housing and connected thereto is utilized to alternatively raise and lower the barrier module of FIG. 14.

FIG. 15 illustrates another embodiment of the invention which is the same as that shown in FIG. 14, but also includes a wheel 90 which is attached to the housing portion 92 and provides support therefor.

The invention claimed is:

1. Apparatus for picking up and laterally transferring a roadway barrier including a plurality of pivotally interconnected roadway barrier modules, said apparatus comprising, in combination:
a vehicle having a front vehicle end, a rear vehicle end and opposed vehicle sides between said front vehicle end and said rear vehicle end;
first and second elongated conveyors, each elongated conveyor having a proximal conveyor end pivotally connected to said vehicle and a distal conveyor end; and
conveyor mover structure on said vehicle connected to at least the first elongated conveyor to pivot the first elongated conveyor relative to said vehicle between an inoperative position and an operative position, said first elongated conveyor when in said operative position extending forwardly in the direction of travel of said vehicle and operative to serially pick up roadway barrier modules of a roadway barrier at the distal end of the first elongated conveyor as said vehicle moves along the roadway barrier and convey the picked up roadway barrier modules toward the proximal end of said second elongated conveyor, said second elongated conveyor operable to convey barrier modules received from said first elongated conveyor and discharge the received roadway barrier modules from the distal end of the second elongated conveyor and position the received roadway barrier modules on the roadway, said first elongated conveyor and said second elongated conveyor separately and independently movable by said conveyor mover structure, said conveyor mover structure operable to lift and elevate said first and second elongated conveyors and position at least portions of said first and second elongated conveyors over said vehicle to reduce the overall width of said apparatus.

2. The apparatus according to claim 1 wherein each of said first and second elongated conveyors includes a housing pivotally connected to said vehicle and a plurality of conveyor transport elements within said housing for engaging, lifting and transporting said roadway barrier modules during movement of said apparatus along said roadway barrier.

3. The apparatus according to claim 2 wherein said elongated conveyors are curved and in combination form an S-shaped configuration when both of said elongated conveyors are in operative position.

4. The apparatus according to claim 1 wherein the proximal ends of said first and second elongated conveyors are pivotally interconnected to said vehicle by a pivot structure enabling said first and second elongated conveyors to pivot and move in a horizontal plane when in operative position.

5. The apparatus according to claim 2 wherein the housings of each of said first and second elongated conveyors include open-ended housing portions at the distal ends thereof articulated relative to the rest of the first and second elongated conveyors.

6. The apparatus according to claim 5 including supports connected to said open-ended housing portions for supporting the distal ends of said first and second elongated conveyors when said first and second elongated conveyors are in operative position.

7. The apparatus according to claim 6 wherein said supports comprise wheels engaging and supported by a support surface.

8. The apparatus according to claim 7 wherein said wheels are rotatably mounted on said articulated housing portions and extend into the interiors of said articulated housing portions for engagement with upper surfaces of said roadway barrier modules to support the distal ends of said first and second elongated conveyors.

9. The apparatus according to claim 7 wherein said wheels extend downwardly externally of said articulated housing portions, are connected thereto, and are positionable on a roadway surface.

10. The apparatus according to claim 8 additionally comprising spacers attached to said articulated housing portions and entering into the interiors thereof for engaging sides of roadway barrier modules within said interiors to substantially center the roadway barrier modules therein and prevent direct engagement of the roadway barrier modules with outer walls of the articulated housing portions.

11. The apparatus according to claim 2 wherein said conveyor transport element comprise rotatable conveyor transport elements engageable with the transported roadway barrier modules at opposite sides of the transported roadway barrier modules.

12. The apparatus according to claim 11 wherein said rotatable conveyor transport elements are rotatable wheels.

13. The apparatus according to claim 1 wherein said first and second elongated conveyors are connected to said vehicle between the front vehicle end and the rear vehicle end, said first conveyor when in operative position extending in the direction of the front vehicle end and said second elongated conveyor when in operative position extending in the direction of the rear vehicle end.

14. A method for picking up and transferring a roadway barrier including a plurality of interconnected roadway barrier modules, said method comprising the following steps:
providing a vehicle having a front vehicle end, a rear vehicle end and opposed vehicle sides between said front vehicle end and said rear vehicle end;
providing barrier transport structure having a proximal end and a distal end;
employing said support vehicle to support said proximal end;
employing said roadway barrier to support said distal end; and
utilizing said barrier transport structure to serially pick up roadway barrier modules of the roadway barrier as said vehicle moves along the roadway barrier and convey the picked up roadway barrier modules toward the proximal end.

15. The method according to claim 14 including the step of conveying the picked up roadway barriers received at the proximal end to a roadway location spaced from said distal end.

16. Apparatus for picking up and laterally transferring a roadway barrier including a plurality of pivotally interconnected roadway barrier modules, said apparatus comprising, in combination:
- a vehicle having a front vehicle end, a rear vehicle end and opposed vehicle sides between said front vehicle end and said rear vehicle end;
- first and second elongated conveyors, each elongated conveyor having a proximal conveyor end pivotally connected to said vehicle and a distal end; and
- conveyor mover structure on said vehicle connected to at least the first elongated conveyor to pivot the first elongated conveyor relative to said vehicle between an inoperative position and an operative position, said first elongated conveyor when in said operative position extending forwardly in the direction of travel of said vehicle and operative to serially pick up roadway barrier modules of a roadway barrier at the distal end of the first elongated conveyor as said vehicle moves along the roadway barrier and convey the picked up roadway barrier modules toward the proximal end of said second elongated conveyor, said second elongated conveyor operable to convey barrier modules received from said first elongated conveyor and discharge the received roadway barrier modules from the distal end of the second elongated conveyor and position the received roadway barrier modules on the roadway, said vehicle comprising a tractor and a trailer towed by said tractor, the first elongated conveyor pivotally connected to said tractor to move upwardly relative thereto and the second elongated conveyor pivotally connected to said trailer to move upwardly relative thereto.

17. The apparatus according to claim 16 wherein said first and second elongated conveyors are pivotally mounted to move horizontally about a pivot pivotally interconnecting said tractor and said trailer.

18. Apparatus for picking up and laterally transferring a roadway barrier including a plurality of pivotally interconnected roadway barrier modules, said apparatus comprising, in combination:
- a vehicle having a front vehicle end, a rear vehicle end and opposed vehicle sides between said front vehicle end and said rear vehicle end;
- first and second elongated conveyors, each elongated conveyor having a proximal conveyor end pivotally connected to said vehicle and a distal conveyor end; and
- conveyor mover structure on said vehicle connected to the first elongated conveyor and to the second elongated conveyor to pivot the first elongated conveyor and the second elongated conveyor relative to said vehicle between an inoperative position and an operative position, said first elongated conveyor when in said operative position extending forwardly in the direction of travel of said vehicle and operative to serially pick up roadway barrier modules of a roadway barrier at the distal end of the first elongated conveyor as said vehicle moves along the roadway barrier and convey the picked up roadway barrier modules toward the proximal end of said second elongated conveyor, said second elongated conveyor operable to convey barrier modules received from said first elongated conveyor and discharge the received roadway barrier modules from the distal end of the second elongated conveyor and position the received roadway, said first elongated conveyor and said second elongated conveyor each including a housing pivotally connected to said vehicle and a plurality of conveyor transport elements within said housing for engaging, supporting and transporting said roadway barrier modules during movement of said apparatus along said roadway barrier, the housing of each of said first and second elongated conveyors including an open-ended distal housing portion at the distal conveyor end thereof, and rotatable supports connected to said open-ended distal housing portions extending downwardly within interiors of the open-ended housing portions engaging and supported against downward movement by upper surfaces of said roadway barrier modules and providing sole support for the distal conveyor ends of said first and second elongated conveyors when said first and second elongated conveyors are in operative position.

* * * * *